United States Patent
Okuno (10) Patent No.: US 11,665,291 B2
(45) Date of Patent: May 30, 2023

(54) IMAGE PROCESSING APPARATUS, SERVER, CONTROLLING METHOD FOR IMAGE PROCESSING APPARATUS, NON-TRANSITORY RECORDING MEDIUM REALIZING CONTROLLING METHOD

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/202,448

(22) Filed: Mar. 16, 2021

(65) Prior Publication Data
US 2021/0306477 A1   Sep. 30, 2021

(30) Foreign Application Priority Data

Mar. 31, 2020   (JP) .............................. JP2020-062485

(51) Int. Cl.
*H04N 1/00* (2006.01)
(52) U.S. Cl.
CPC ....... *H04N 1/00217* (2013.01); *H04N 1/0097* (2013.01); *H04N 1/00244* (2013.01); *H04N 1/00832* (2013.01)
(58) Field of Classification Search
CPC ........... H04N 1/00217; H04N 1/00244; H04N 1/00832; H04N 1/0097
See application file for complete search history.

(56) References Cited

U.S. PATENT DOCUMENTS

| | | | | |
|---|---|---|---|---|
| 2002/0107956 A1* | 8/2002 | Nakagawa | ......... | G06Q 30/0283 709/215 |
| 2002/0159365 A1* | 10/2002 | Yamashita | ............. | G11B 19/26 369/47.39 |
| 2004/0046972 A1* | 3/2004 | Shibao | ............... | H04N 1/00832 358/1.14 |

(Continued)

FOREIGN PATENT DOCUMENTS

| | | |
|---|---|---|
| JP | 2008-186101 A | 8/2008 |
| JP | 2011-135522 A | 7/2011 |

(Continued)

*Primary Examiner* — King Y Poon
*Assistant Examiner* — Michael L Burleson
(74) *Attorney, Agent, or Firm* — Scully, Scott, Murphy & Presser, PC (57) ABSTRACT

An MFP is configured to perform an upper limit setting process of setting an upper limit value of scan data amount storable in a RAM, a scanning process of controlling a scanning device to generate scan data of one document medium and store the scan data in the RAM, a determining process of determining, after performing the scanning process, whether an amount of the scan data accumulated in the storage exceeds the upper limit value, when determining that the amount of the scan data exceeds the upper limit value, a transmitting process of inhibiting the scanning process and transmitting the scan data accumulated in the RAM to a server through a communication device, and a releasing process of deleting the scan data accumulated in the RAM and releasing inhibition of the scanning process after performing the transmitting process.

7 Claims, 7 Drawing Sheets

(56) References Cited

U.S. PATENT DOCUMENTS

| | | | |
|---|---|---|---|
| 2005/0197860 A1* | 9/2005 | Joffe | G16H 30/20 705/2 |
| 2006/0034313 A1* | 2/2006 | Aaltonen | H04W 4/00 370/473 |
| 2006/0072179 A1* | 4/2006 | Caster | H04N 1/0005 359/202.1 |
| 2007/0058534 A1* | 3/2007 | Shimonishi | H04L 47/10 370/230 |
| 2010/0053678 A1* | 3/2010 | Yoshihisa | H04N 1/00519 358/1.15 |
| 2010/0185750 A1* | 7/2010 | Nakayama | H04N 1/00464 709/219 |
| 2012/0147412 A1 | 6/2012 | Tsujimoto | |
| 2015/0095411 A1* | 4/2015 | Okumura | H04N 1/00 709/203 |
| 2016/0070943 A1* | 3/2016 | Zhu | G06K 7/10554 235/462.33 |
| 2018/0109694 A1* | 4/2018 | Akiyoshi | H04N 1/00917 |

FOREIGN PATENT DOCUMENTS

| | | |
|---|---|---|
| JP | 2012-136015 A | 7/2012 |
| JP | 2018-106329 A | 7/2018 |

\* cited by examiner

IMAGE PROCESSING APPARATUS, SERVER, CONTROLLING METHOD FOR IMAGE PROCESSING APPARATUS, NON-TRANSITORY RECORDING MEDIUM REALIZING CONTROLLING METHOD

CROSS-REFERENCE TO RELATED APPLICATIONS

This application claims priority under 35 U.S.C. § 119 from Japanese Patent Application No. 2020-062485 filed on Mar. 31, 2020. The entire subject matter of the application is incorporated herein by reference.

BACKGROUND

Technical Field

The present disclosures relate to an image processing apparatus equipped with a scanning device configured to generate scan data of a document medium, a server configured to communicate with the image processing apparatus via a network, a controlling method for the image processing apparatus, and a non-transitory computer-readable recording medium containing instructions realizing the controlling method.

Related Art

Conventionally, there has been known a configuration in which an image processing apparatus and a server are connected via a network and scan data is transmitted from the image processing apparatus to the server.

SUMMARY

In the image processing apparatus, there is a case where the scan data of a plurality of recording media is generated and the scan data is transmitted to the server at one time. In such a case, the scan data can be transmitted efficiently in a short time compared to sending the scan data for each document medium.

However, the storage of the image processing apparatus has a limited capacity, and if the amount of the scan data accumulated in the storage exceeds the capacity, the scan data having been accumulated in the storage will be deleted therefrom, and it might become necessary to start scanning the images of the plurality of recording media from the beginning.

According to aspects of the present disclosure, there is provided an image processing apparatus, comprising a communication device configured to communicate with a server through a network, a scanning device configured to generate scan data of an image of a document medium, a storage, and a controller. The controller is configured to perform an upper limit setting process of setting an upper limit value of scan data amount storable in the storage, a scanning process of controlling the scanning device to generate the scan data of one document medium and store the scan data in the storage, a determining process of determining, after performing the scanning process, whether an amount of the scan data accumulated in the storage exceeds the upper limit value. When the controller determines that the amount of the scan data exceeds the upper limit value, the controller performs a transmitting process of inhibiting the scanning process and transmitting the scan data accumulated in the storage to the server through the communication device, and a releasing process of deleting the scan data accumulated in the storage and releasing inhibition of the scanning process after performing the transmitting process.

According to aspects of the present disclosure, there is provided a server, comprising a server communicating device configured to communicate with an image processing apparatus via a network, a server storage, and a server controller. The image processing apparatus is provided with a scanning device configured to generate scan data of a document medium and an apparatus storage. The server storage stores an upper limit value of the scan data storable in the apparatus storage. The server controller is configured to perform a transmitting process of transmitting the upper limit value stored in the server storage to the image processing apparatus via the server communication device, and a receiving process of receiving the scan data accumulated in the apparatus storage from the image processing apparatus via the server communication device after the transmitting process is performed.

According to aspects of the present disclosure, there is provided a method of controlling an image processing apparatus having a communication device configured to communicate with a server through a network, a scanning device configured to generate scan data of an image of a document medium, and a storage. The method comprising an upper limit setting process of setting an upper limit value of scan data amount storable in the storage, a scanning process of controlling the scanning device to generate the scan data of one document medium and store the scan data in the storage, a determining process of determining, after performing the scanning process, whether an amount of the scan data accumulated in the storage exceeds the upper limit value, when determines that the amount of the scan data exceeds the upper limit value in the determining process, a transmitting process of inhibiting the scanning process and transmitting the scan data accumulated in the storage to the server through the communication device, and a releasing process of deleting the scan data accumulated in the storage and releasing inhibition of the scanning process after performing the transmitting process.

According to aspects of the present disclosure, there is provided a non-transitory computer-readable recording medium for an image processing apparatus having a communication device configured to communicate with a server through a network, a scanning device configured to generate scan data of an image of a document medium, a storage, and a controller. The recording medium is configured to store instructions which cause, when executed by the controller, the image processing apparatus to perform setting an upper limit value of scan data amount storable in the storage, controlling the scanning device to perform scanning of generating the scan data of one document medium and storing the scan data in the storage, determining, after performing the scanning, whether an amount of the scan data accumulated in the storage exceeds the upper limit value, inhibiting the scanning and transmitting the scan data accumulated in the storage to the server through the communication device when the controller determines that the amount of the scan data exceeds the upper limit value, and deleting the scan data accumulated in the storage and releasing inhibition of the scanning after performing the transmitting of the scan data.

DETAILED DESCRIPTION OF EMBODIMENT

Overall System Configuration

Figure 1:
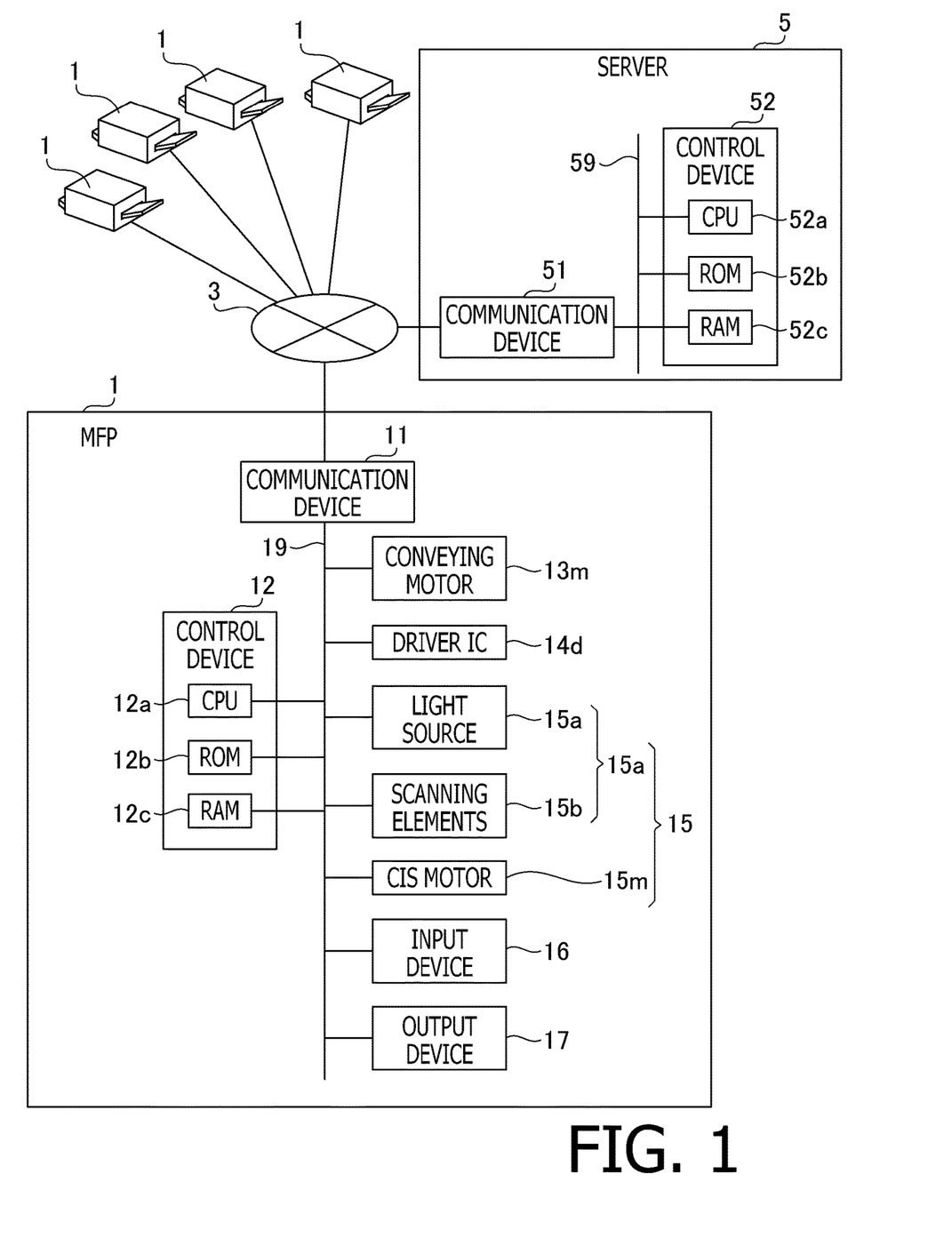
FIG. 1 shows an overall configuration of a system including an MFP and a server according to aspects of the present disclosures.

A system shown in FIG. 1 includes a plurality of MFPs 1 and a server 5. The MFP 1 is an embodiment of an image processing apparatus according to aspects of the present disclosures. Each of the plurality of MFPs 1 is communicably connected to the server 5 via a network 3. For example, the MFPs 1 are provided in respective homes, and the server 5 is installed in a vendor's office.

Configuration of MFP

As shown in FIG. 1, the MFP 1 has a communication device 11, a controller 12, a conveying motor 13m, a driver IC 14d, a scanning device 15, an input device 16, and an output device 17, which are interconnected via an internal bus 19.

The communication device 11 is an interface for communicating with external devices (e.g., the server 5, a personal computer and etc.) via the network 3.

The controller 12 includes a CPU 12a, a ROM 12b, and a RAM 12c. The CPU 12a of the controller 12 are examples of a controller according to aspects of the present disclosures, and the RAM 12c is an example of a storage and/or a storing device according to aspects of the present disclosures. The ROM 12b stores programs and data for the CPU 12a to perform various controls, and the RAM 12c temporarily stores data used by the CPU 12a in executing the programs.

Figure 2:
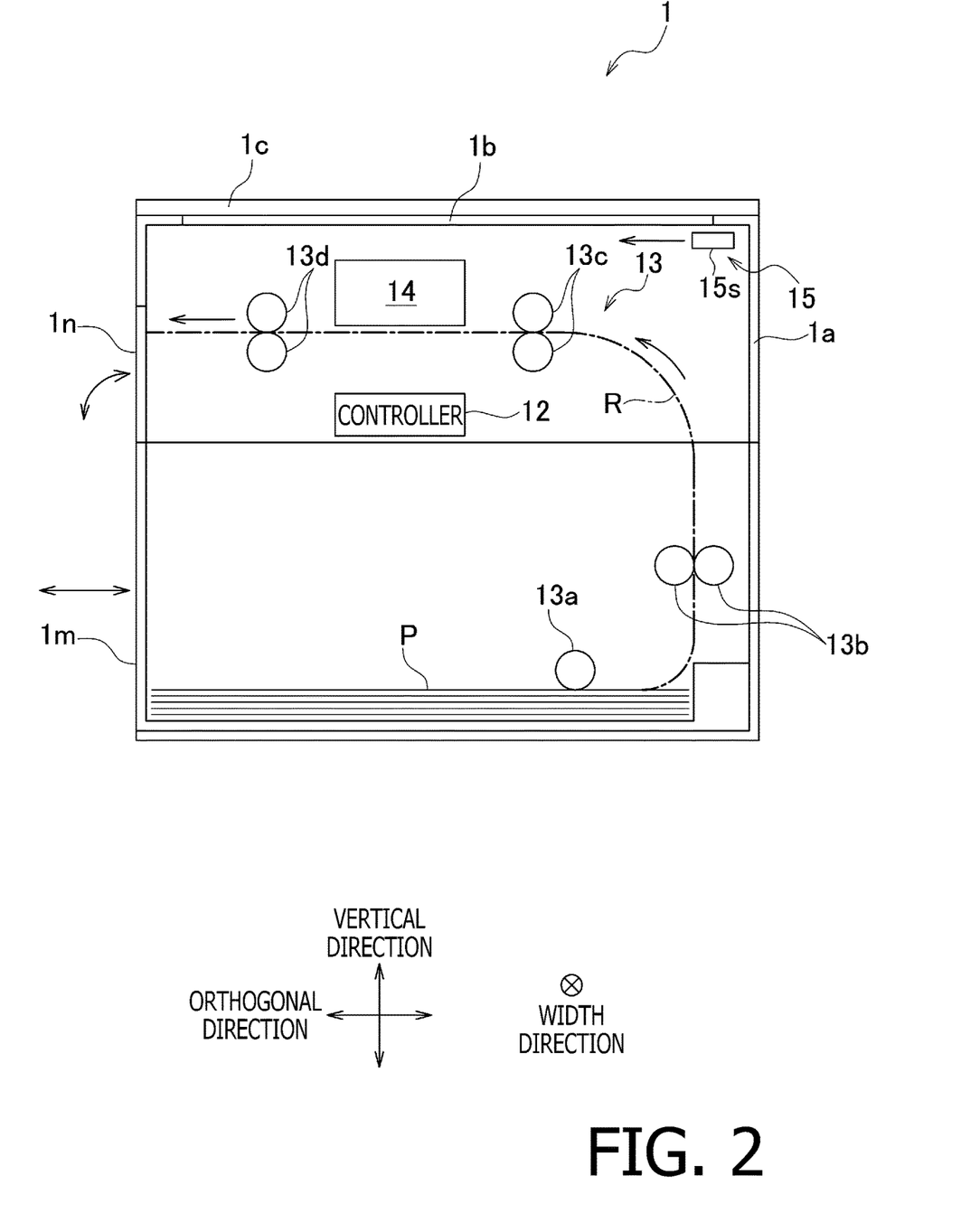
FIG. 2 is a schematic side view showing an internal structure of the MFP.

The MFP 1 also has, as shown in FIG. 2, a housing 1a, a translucent plate 1b fitted into an upper opening of the housing 1a, a cover 1e openably attached to an upper part of the housing 1a, a sheet feed cassette 1m detachably attached to a lower part of the housing 1a, and a discharging tray 1n openably secured to the housing 1a. In an upper part of the housing 1a, the controller 12, a head 14, and a scanning device 15 are arranged.

The sheet feed cassette 1m is configured to accommodate a plurality of original document sheets P which are stacked one by one in a flat state. The document sheet P is an example of a document medium according to aspects of the present disclosures. The original document sheets P are accommodated in the sheet feed cassette 1m in an orientation orthogonal to the vertical direction (i.e., in a horizontally extended manner).

A direction orthogonal to a plane of FIG. 2 is a width direction of the document sheet P (i.e., a paper width direction). The sheet feed cassette 1m is configured to move from the sheet feed cassette 1m, with respect to the housing 1a, in a direction orthogonal to both the vertical direction and the width direction of the original document sheets P.

The sheet feed cassette 1m is provided with a sheet feed roller 13a, which constitutes a conveying device 13 described below.

The conveying device 13 includes the sheet feed roller 13a, a roller pair 13b arranged in a lower portion inside the housing 1a, roller pairs 13c, 13d arranged in an upper portion inside the housing 1a (see FIG. 2), and the conveying motor 13m (see FIG. 1). Each of the rollers of the paper feed rollers 13a, the roller pairs 13b-13d has an elongated cylindrical shape extending in the width direction.

The sheet feed roller 13a configured to rotate as driven by the conveying motor 13m. Each of the roller pairs 13b, 13c and 13d has a drive roller which is driven by the conveying motor 13m to rotate and a driven roller which is accompanied by the drive roller.

When the conveying motor 13m (see FIG. 1) is driven by the controller 12, the sheet feed roller 13a which is in contact with the topmost one of the document sheets P contained in the document sheet cassette 1m, and the contacted document sheet P is fed toward the roller pair 13b. Each of the roller pairs 13b, 13c and 13d rotates while holding the document sheet P, thereby the document sheet P being conveyed along the sheet conveying path R.

The head 14 is arranged above an area defined between the roller pair 13c and the roller pair 13d in the sheet conveying path R. Multiple nozzles (not shown) configured to eject ink droplets are formed on a lower surface of the head 14.

When a driver IC 14d (see FIG. 1) is driven by the control device 12, the ink is ejected from the nozzles and an image is formed on the document sheet P located in the above area.

The head 14 may be of either a linear type that is located at a fixed position and ejects ink from the nozzles linearly distributed in the width direction, or a serial type that ejects ink from the nozzle while moving in the width direction.

The document sheet P, on which the image has been recorded by the head 14, is discharged into a discharge tray 1n, which is opened from the housing 1a.

The scanning device 15 is of a flatbed type and has a line sensor 15s and a CIS motor 15m (see FIG. 1). The line sensor 15s is of a CIS type having an unmagnification optical system and includes a light source 15a, a lens (not shown), and scanning elements 15b.

A document sheet P to be scanned is placed on the translucent plate 1b. Then, as the cover 1e is closed, light from the outside is suppressed from entering the line sensor 15s.

When scanning an image of document sheet P placed on the translucent plate 1b, the CIS motor 15m is driven by the control device 12, thereby the line sensor 15s moves in an orthogonal direction along the translucent plate 1b. At this time, the light emitted from the light source 15a passes through the translucent plate 1b and is reflected by the document sheet P, and passes through the lens and enters the scanning elements 15b. The scanning elements 15b generate scan data (data indicating the amount of light received) by converting the received light into electrical signals, and outputs the scan data to the control device 12.

Figure 3:
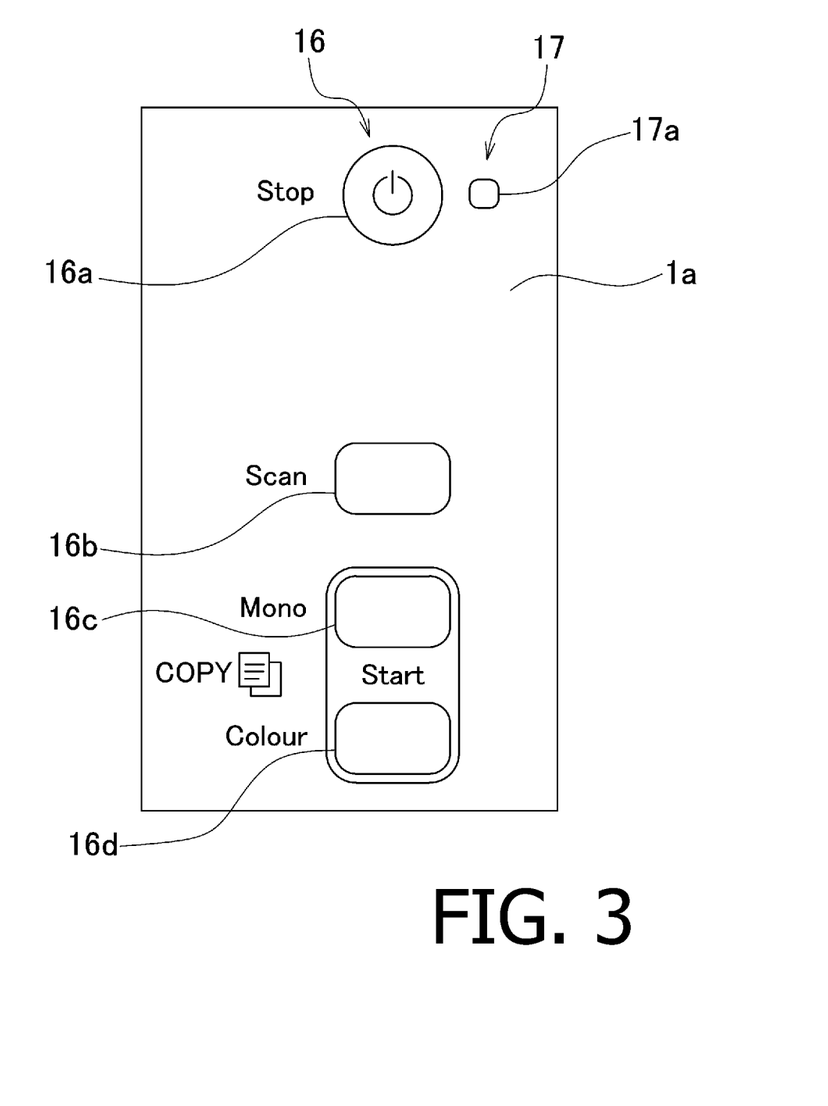
FIG. 3 is schematic diagram showing an input device and an output device of the MFP.

The input device 16 is an element for receiving operations by a user, and includes for example, operational buttons, a keyboard, a mouse, a touch panel, and the like. In this embodiment, the input device 16 includes four buttons 16a to 16d provided on an outer surface of the housing 1a as shown in FIG. 3. The buttons 16a and 16b are for instruction "stop scanning" and "start scanning," respectively. Both the buttons 16c and 16d are for instruction "transmit data." Specifically, the button 16c is used for instructing transmitting the scan data as monochrome image data, and the button 16d is used for instructing transmitting the scan data as color image data.

The output device 17 is for outputting images or sound, and includes, for example, LEDs, a display, a speaker, and the like. In this embodiment, the output device 17 includes an LED 17a provided on an outer surface of the housing 1a as shown in FIG. 3.

Server Configuration

As shown in FIG. 1, the server 5 is equipped with a communication device 51 and a control device 52, which are connected to each other via an internal bus 59.

The communication device 51 is an example of a server communication device according to aspects of the present disclosures and serves as an interface for communicating with each MFP 1 via the network 3.

The control device 52 includes a CPU 52a, a ROM 52b, and a RAM 52c. The CPU 52a is an example of a server controller according to aspects of the present disclosures, and the RAM 52c is an example of server storage according to aspects of the present disclosures. The ROM 52b stores programs and data for the CPU 52a to control various components of the server 5. The RAM 52c temporarily stores data used by the CPU 52a in executing the programs.

The RAM 52c of the server 5 stores information (upper limit information) about an upper limit for the amount of scan data to be stored in the RAM 12c of each MFP 1. The upper limit information varies for each MFP 1. That is, the RAM 52c stores multiple pieces of upper limit information that may be different for respective MFPs 1. Further, for each MFP 1, one or more upper limit values are stored in the RAM 52c.

The RAM 52c of the server 5 stores, in addition to the upper limit information, setting information (e.g., a resolution of the scan data, a file format of the scan data, a size of the document sheet P to be read, whether transmission of the scan data of the plurality of original document sheets P is permitted or not, a URL of the destination of the scan data, etc.) different for each MFP 1. In this embodiment, the description is made based on the assumption that transmission of the scan data representing images of a plurality of original document sheets P is permitted in each MFP 1.

Scan Program

Next, a scanning process performed in each MFP 1 and the server 5 will be described.

The scanning process is performed, for example, in a case where a user writes answers on a document sheet P on which homework is printed (i.e., the document sheet P printed by the head 14 of the MFP 1) in each home where the MFP 1 is installed, makes the image of the document sheet P after the answers are written scanned by the scanning device 15 of the MFP 1, and then transmits the scan data to an educational service provider's server 5.

Firstly, referring to FIGS. 4A, 4B and 5, the scanning process performed by the MFP 1 will be described.

Figure 4A:
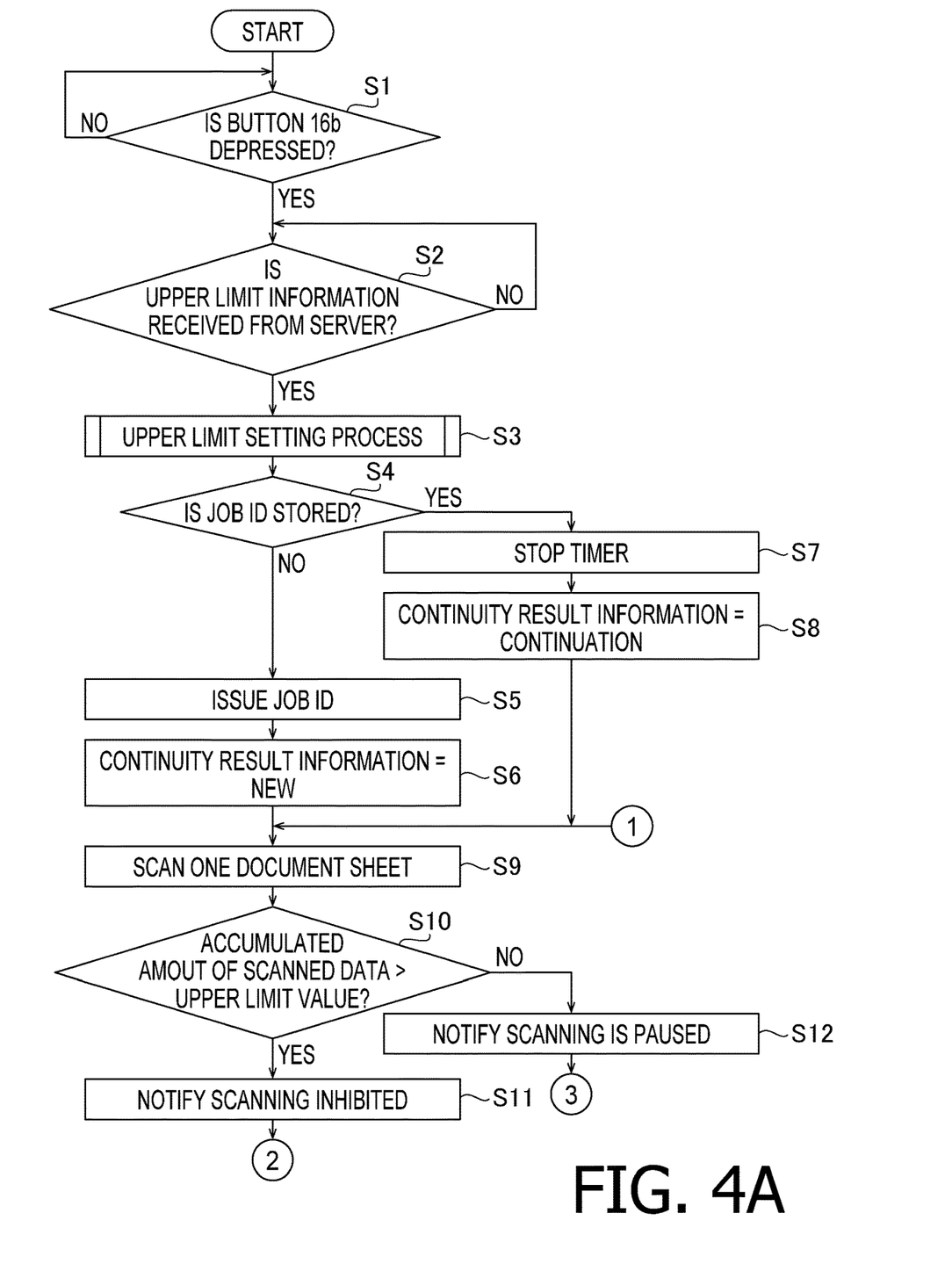
FIGS. 4A and 4B show a flowchart illustrating a scanning process performed by the MFP.
Figure 4B:
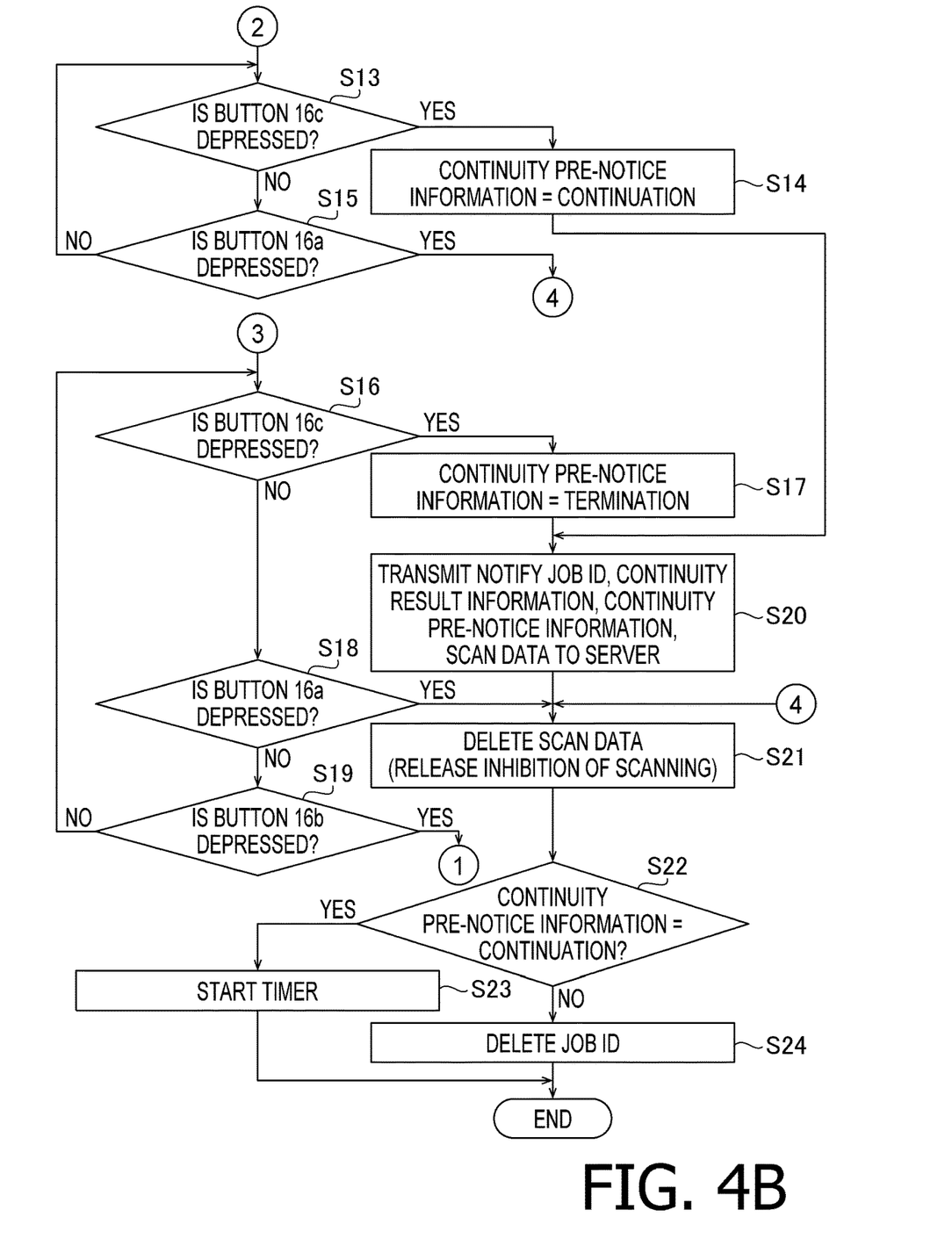

As shown in FIGS. 4A and 4B, the CPU 12a of the MFP 1 firstly determines whether the button 16b (see FIG. 3), which instructs "start scanning," has been depressed (S1). When it is determined that the button 16b has not been depressed (S1: NO), the CPU 12a repeats step S1.

When it is determined that the button 16b has been depressed (S1: YES), the CPU 12a determines whether or not the upper limit information is received from the server 5 via the communication unit 11 (S2). When it is determined that the upper limit information has not been received (S2: NO), the CPU 12a repeats step S2.

When it is determined that the upper limit information has been received (S2: YES), the CPU 12a sets the upper limit value of the amount of scan data to be stored in the RAM 12c based on the upper limit information (S3: upper limit value setting process).

Figure 5:
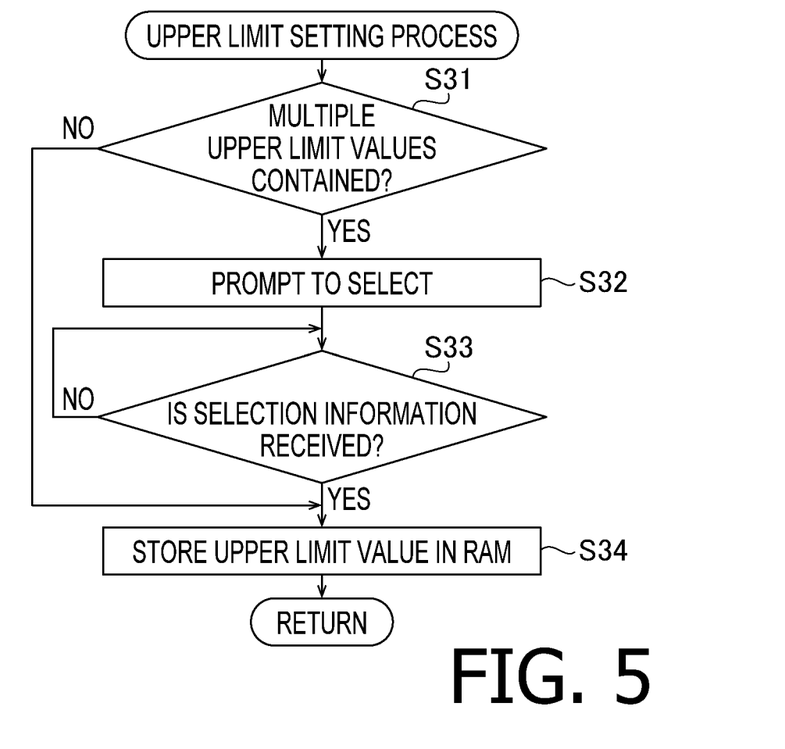
FIG. 5 shows a flowchart illustrating an upper limit setting process referred to in the scanning process shown in FIGS. 4A and 4B.

In the upper limit value setting process (S3), the CPU 12a first determines whether the upper limit information received from the server 5 includes a plurality of upper limits (S31), as shown in FIG. 5.

When it is determined that the upper limit information received from the server 5 includes the plurality of upper limits (S31: YES), the CPU 12a prompts the user to select one of the plurality of upper limits (S32: prompting process).

In S32, the CPU 12a may, for example, cause the display of the output device 17 to display a selection screen prompting the user to select one of the plurality of upper limits, or cause the speaker of the output device 17 to output an audio output requesting the user to select one of the plurality of upper limits. Alternatively, in the case where the output device 17 does not have a display or the like, the CPU 12a may cause the selection screen to be displayed on the display of the PC connected to the MFP 1.

The user inputs selected one of the plurality of upper limits via the input device 16 (e.g., buttons 16a-16d, touch panel, etc.) based on the prompting screen or voice request in S32.

After executing S32, the CPU 12a determines whether or not information on which of the plurality of upper limits is to be selected has been received from the input device 16 (S33). When it is determined that information on which of the plurality of upper limit values is to be selected has not been received (S33: NO), the CPU 12a repeats the process S33.

When it is determined that information on which of the plurality of upper limits is to be selected has been received (S33: YES), the CPU 12a stores the selected upper limit, which is selected by the user among the plurality of upper limits, in the RAM 12c based on the received information (S34: setting process).

When it is determined that the upper limit information received from the server 5 does not include the plurality of upper limits (i.e., only one upper limit is included) (S31: NO), the CPU 12a stores the one upper limit in RAM 12c (S34).

After executing S34, the CPU 21 terminates the scanning process shown in FIG. 4.

After executing S3 (upper limit setting process), the CPU 12a determines whether or not "job ID (identification information of the job relating to scanning of an image of one or more original document sheets P)" is stored in the RAM 12c as shown in FIG. 4 (S4).

When it is determined that the "job ID" is not stored in RAM 12e (S4: NO), the CPU 12a issues a new "job ID" and stores it in the RAM 12c (S5).

After executing S5, the CPU 12a stores information indicating "new (that the current scan data being not a continuation of the previously transmitted scan data)" as "continuity result information" indicating whether or not the current scan data is a continuation of the previously transmitted scan data (S6), in the RAM 12c.

When the "job ID" is stored in the RAM 12c (S4: YES), the CPU 12a terminates the timer, which will be started in S23 described below (S7).

After executing S7, the CPU 12a stores information indicating "continuity (that the current scan data is a continuation of the previously transmitted scan data)" as "continuity result information" indicating whether or not the current scan data is a continuation of the previously transmitted scan data (S8), in the RAM 12c.

After executing S6 or S8, the CPU 12a controls the scanning device 15 to generate the scan data of an image of a sheet of document sheet P, and stores the scan data in the RAM 12c (S9: scanning process).

In S9, CPU 12a controls the scanning device 15 to generate scan data based on the setting information (e.g., the resolution of the scan data, the file format of the scan data, the size of document sheet P to be read, whether consecutive scanning of multiple original document sheets P is permitted or not, the URL of the transmission destination of the scan data, etc.) which has been received in advance from the server 5.

After executing S9, the CPU 12a determines whether the amount of scan data accumulated in the RAM 12c exceeds the upper limit set in S3 (S10: determining process).

When it is determined that the amount of scan data accumulated in the RAM 12c exceeds the upper limit set in S3 (S10: YES), the CPU 12a notifies inhibition of the scanning process (S11).

When it is determined that the amount of scan data accumulated in the RAM 12c does not exceed the upper limit set in S3 (S10: NO), the CPU 12a notifies the user that the reading process is suspended (S12).

In S11 and S12, the CPU 12a may, for example, cause a display of the output device 17 to display a screen indicating the above-described notifications, or cause the speaker of the output device 17 to output an audio message indicating the above-described notifications. Alternatively, when the output device 17 does not have a display, the CPU 12a may cause the display of the personal computer connected to the MFP 1 to display a screen indicating the above-described notifications on the display. Alternatively or optionally, the CPU 12a may indicate the above-described notifications by flashing or lighting the LED 17a of the output device 17 (see FIG. 3). Modes of the notification in S11 and S12 (e.g., the content of the display, the content of the sound, the mode of flashing or lighting of the LED 17a, etc.) are different from each other.

After executing S11, the CPU 12a determines whether the button 16c or 16d (see FIG. 3) instructing "data transmission" has been pressed (S13).

When it is determined that the button 16c or 16d is depressed (S13: YES), the CPU 12a stores, to the RAM 12c, information indicating "continuity (to send more pieces of scan data after transmitting the current scan data)" as "continuity pre-notice information" indicating whether or not to send more pieces of scan data after the current scan data is to be transmitted (S14).

When it is determined that the button 16c or 16d has not been depressed (S13: NO), the CPU 12a determines whether or not the button 16a (see FIG. 3) indicating "stop scanning" has been depressed (S15).

When it is determined that the button 16a has not been depressed (S15: NO), the CPU 12a returns to S13.

After executing S12, the CPU 12a determines whether the button 16c or 16d (see FIG. 3) instructing "data transmission" has been depressed (S16).

When it is determined that button 16c or 16d has been depressed (S16: YES), in S17, the CPU 12a stores, in the RAM 12c, information indicating "termination (no further scan data will be transmitted after present scan data is transmitted)" as the "continuity pre-notice information" indicating whether or not further scan data will be transmitted after the present scan data is transmitted.

When it is determined that the button 16c or 16d has not been depressed (S16: NO), the CPU 12a determines whether or not the button 16a (see FIG. 3) indicating "stop scanning" has been depressed (S18).

When it is determined that the button 16a has not been depressed (S18: NO), the CPU 12a determines whether or not the button 16b (see FIG. 3) instructing "start scanning" (S19), has been depressed.

When it is determined that button 16b has been depressed (S19: YES), the CPU 12a returns to S9.

When it is determined that button 16b has not been depressed (S19: NO), the CPU 12a returns to S16.

When it is determined that the amount of scan data accumulated in the RAM 12c does not exceed the upper limit value set in S3 (S10: NO), it is determined, in S19, whether or not the button 16b instructing the "start scanning" is depressed, and when the button 16b is depressed (S19: YES), the scanning process (S9) is executed. On the other hand, when it is determined that the amount of scan data stored in the RAM 12c exceeds the upper limit value set in S3 (S10: YES), it is not determined whether or not the button 16b instructing the "start scanning" is depressed, and no process is executed even if the button 16b is depressed (i.e., execution of the scanning process (S9) is inhibited).

After executing S14 or S17, the CPU 12a transmits the "job ID," the "continuity result information (new or continuity)," the "continuity pre-notice information (continuity or end)," and the "scan data" stored in the RAM 12c to the server 5 via the communication device 11 (S20: transmitting process).

After executing S20, the CPU 12a deletes the scan data stored in the RAM 12c. Further, if the execution of the scanning process (S9) is inhibited at this point of time, the CPU 12a releases inhibition of execution of the scanning process (S9) (S21: releasing process). As the inhibition is released, whether or not the button 16b instructing the "start scanning" is depressed is determined, and the scanning process becomes performable depending on whether the button 16b is depressed.

When it is determined that the button 16a is depressed (S15: YES, S18: YES), the above process (S21) is executed. In this case, the CPU 12a deletes the scan data without transmitting the scan data to the server 5 (S20: transmitting process).

After executing S21, the CPU 12a determines whether the "continuity pre-notice information" stored in the RAM 12c indicates the "continuity" (S22).

When the "continuity pre-notice information" stored in the RAM 12c indicates the "continuity" (S22: YES), the CPU 12a starts the timer (S23) and then terminates the scanning process.

When the "continuity pre-notice information" stored in the RAM 12c does not indicate "continuity" (i.e., the "termination") (S22: NO), the CPU 12a deletes the "job ID" stored in the RAM 12c (S24) and then terminates the scanning process.

After the timer is started at S23, when a particular time elapses without the button 16b (see FIG. 3) instructing the "start scanning" (see FIG. 3) being depressed, the CPU 12a deletes the "job ID" stored in the RAM 12c. In this case, when the button 16b instructing the "start scanning" is subsequently depressed (S1: YES), a new "job ID" is issued (S5), and information indicating "new (that the current scan data is not a continuation of the previous scan data transmitted last time)" is stored in the RAM 12c as the "continuity result information" (S6).

In other words, when the reading process (S9) is started after the particular amount of time has elapsed since the last transmitting process (S20), the CPU 12a transmits information indicating that "the scan data is not a continuation of the previously transmitted scan data (new)" to the server 5 as the "continuity result information."

On the other hand, when the button 16*b* instructing the "start scanning" is depressed before the particular time elapses after the timer is started at S23 (S1: YES), the "job ID" is stored in the RAM 12*c* (S4: YES), and the information indicating the "continuity (this scan data is a continuation of the scan data that was transmitted last time)" is stored in the RAM 12*c* as the "continuity result information" (S8).

In other words, when the scanning process (S9) is started before the particular time elapses from the last transmitting process (S20), the CPU 12*a* transmits information indicating that "the scan data in question is a continuation of the scan data transmitted last time (continuity)" to the server 5 as the "continuity result information."

Next, referring to FIG. 6, a scanning process executed by the server 5 will be described.

The CPU 52*a* of the server 5 first determines whether the transmission of the upper limit information has been requested by any of the plurality of MFPs 1 (S51). In the present embodiment, when the button 16*b* of the MFP 1 (see FIG. 3) instructing the "start scanning" is depressed, a signal indicating a request for transmission of the upper limit information is transmitted from the MFP 1 to the server 5. When receiving the signal, the CPU 52*a* of the server 5 determines that the transmission of the upper limit information is requested by the MFP 1.

When it is determined that none of the MFPs 1 has requested for the transmission of the upper limit information (S51: NO), the CPU 52*a* repeats the process in S51.

When it is determined that the upper limit information is requested to be transmitted by any of the plural MFPs 1 (S51: YES), the CPU 52*a* transmits the upper limit information corresponding to the MFP 1 from among a plurality of pieces of upper limit information stored in the RAM 52*c* to the MFP 1 via the communication unit 51 (S52: transmitting process).

After executing S52, the CPU 52*a* determines whether to be received the data such as the "job ID," the "continuity result information (new or continuity)," the "continuity pre-notice information (continuation or termination)," the "scan data" and the like transmitted in S20 from any of the plurality of MFPs 1, via the communication unit 51 (S53). When it is determined that the above data has not been received (S53: NO), the CPU 52*a* repeats the process in S53.

When it is determined that the above data is received (S53: YES), the CPU 52*a* determines (S54) whether or not the "continuity pre-notice information" in the above data indicates the "continuity (to send further scan data after the transmission of the current scan data)."

When the "continuity pre-notice information" is information indicating the "continuity (transmitting more scan data after transmitting the current scan data)" (S54: YES), the CPU 52*a* associates the scan data received in S53 with the "job ID" received in S53 and stores the scan data in the RAM 52*c* as a partial file (S55: storing process).

When the "continuity pre-notice information" is not information indicating the "continuity (that more scan data is to be transmitted after the current scan data is transmitted) (S54: NO), in other words, when the "continuity pre-notice information" is not information indicating the "termination (that no scan data is to be transmitted after the current scan data is transmitted)" (S54: NO), the CPU 52*a* determines whether or not the "continuity result information" is information indicating the "continuity (that the current scan data is a continuation of the previously transmitted scan data)" (S56).

When the "continuity result information" is information indicating the "continuity (that the current scan data is a continuation of the previously transmitted scan data)" (S56: YES), the CPU 52*a* combines the scan data received in S53 with the partial file associated with the "job TD" received in S53 which is stored in the RAM 52*c* in S55 (storing process) performed prior to this point of time and stores the thus combined file in the RAM 52*c* (S57: combining process) as a complete file.

When the "continuity result information" is not information indicating the "continuity (the current scan data is a continuation of the scan data previously transmitted)," that is, the "new (the current scan data is not a continuation of the scan data previously transmitted)" (S56: NO), the CPU 52*a* stores the scan data received in S53 as the complete file associated with the "job ID" received in S53 (S58).

After executing S55, S57 or S58, the CPU 52*a* terminates the scanning process.

As described above, according to the present embodiment, by setting an upper limit on the amount of the scan data to be stored (accumulated) in the RAM 12*c* of the MFP 1, the MFP 1 can efficiently transmit scan data in a short time within a range that does not excessively exceed the upper limit, and can avoid the situation where the MFP 1 has to start scanning images of a plurality of document sheets P from the beginning.

In addition, the server 5 does not receive an excessive amount of the scan data that exceeds the upper limit at one time. Therefore, the deterioration of processing efficiency on the server 5 side can be suppressed.

The CPU 52*a* transmits the upper limit value stored in the RAM 52*c* to the MFP 1 (S52). The CPU 12*a* of the MFP 1 stores the upper limit value received from the server 5 in the RAM 12*c* in the upper limit value setting process (S3). In this case, it can be guaranteed that the amount of the scan data transmitted from the MFP 1 does not excessively exceed the upper limit value set by the server 5, so that it is easy to estimate the load on the server 5 side, and the cost for server 5 (investment amount) becomes clearer.

In the upper limit value setting process (S3), the CPU 12*a* of the MFP 1 performs a selection notifying process (S32) to notify the user which of the plurality of upper limit values is selected, and a setting process (S34) to set the upper limit value based on the information received in S33 (receiving process), as shown in FIG. 5. In this case, usability is improved compared to a case where the selection of the upper limit value is not possible.

Figure 6:
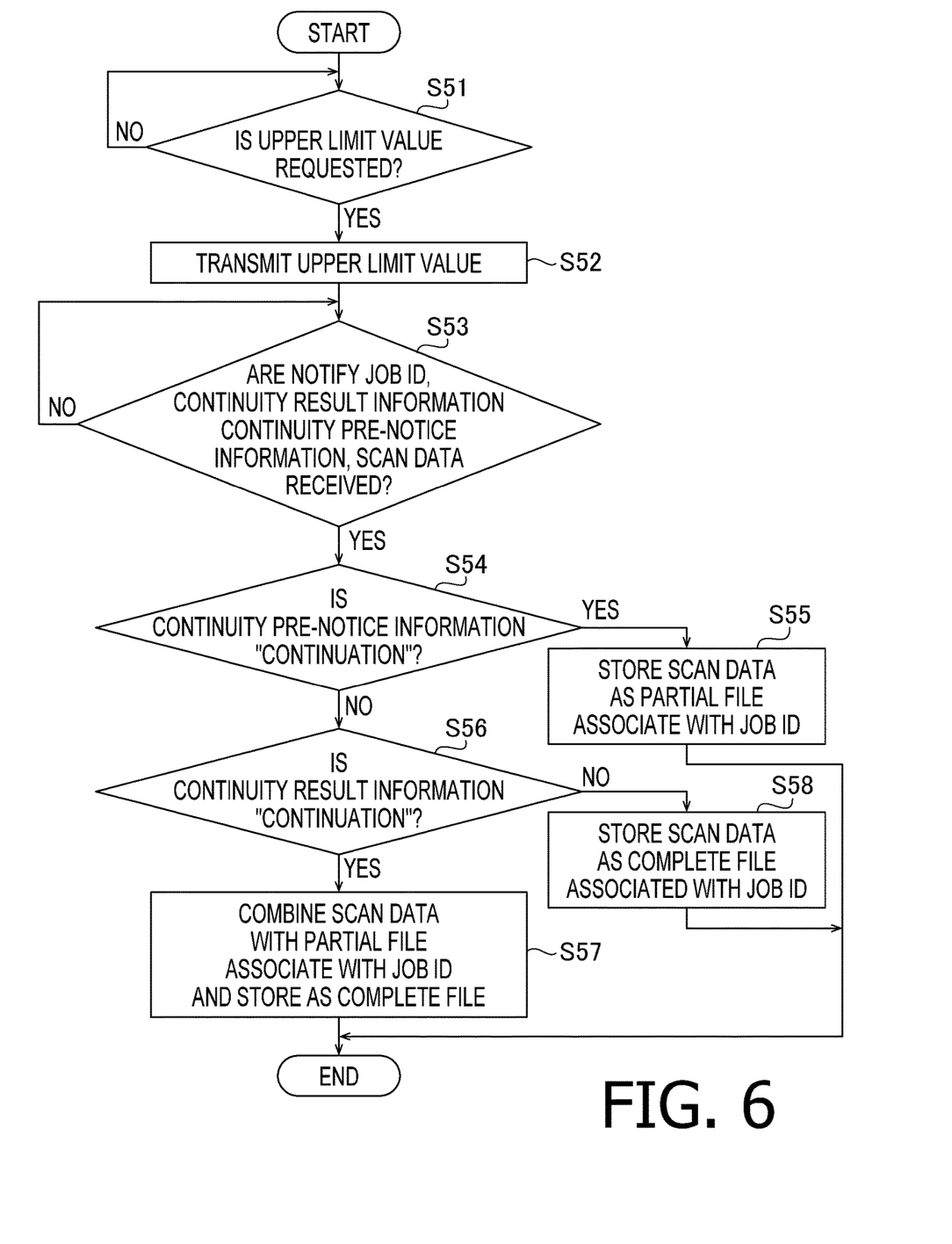
FIG. 6 shows a flowchart illustrating a scanning process performed in the server.

As shown in FIG. 4, the CPU 12*a* of the MFP 1 transmits, in the transmitting process (S20), the "continuity pre-notice information" indicating whether or not to transmit more scan data after the transmission of the scan data to the server 5, in addition to the "scan data." In this case, the server 5 can properly manage the data by performing processes (such as a process of combining related scan data transmitted in small portions with each other: see S54 to S58 of FIG. 6) in accordance with the "continuity pre-notice information" on the server 5 side.

As shown in FIG. 4, the CPU 12*a* of the MFP 1 transmits, in the transmitting process (S20), the "continuity result information" indicating whether or not the current scan data is a continuation of the previously transmitted scan data to the server 5, in addition to the "scan data." In this case, on the server 5 side, processes (see S56 to S58 of FIG. 6)

according to the "continuity result information" can be performed to manage the data properly.

When the scanning process (S9) is started before the particular time elapses from the previous transmitting process (S20), the CPU 12a of the MFP 1 transmits information indicating that the current scan data is a continuation of the transmitted scan data transmitted last time (continuation) to the server 5 as the "continuity result information," and then transmits the information indicating that the scan data is a continuation of the previous transmitting process to the server 5 as the "continuity result information." When the scanning process (S9) is started after the particular time has elapsed from the previous transmitting process (S20), information indicating that the current scan data is not a continuation of the previously transmitted scan data (i.e., new) is transmitted to the server 5 as the "continuity result information." In this case, based on the elapsed time, the "continuity result information" can be efficiently determined.

The scanning device 15 is of the flatbed type (see FIG. 2). In this case, the scanning device 15 is suitable for scanning the document sheets P one by one, and the determining process (S10) for each scanning of one sheet of the document sheets P can be realized more effectively.

The RAM 52c of the server 5 stores different upper limit information for each MFP 1. The CPU 52a of the server 5 transmits the upper limit information corresponding to the MFP 1 from among a plurality of pieces of upper limit information stored in the RAM 52c to the MFP 1 via the communication unit 51 (S52). In this case, the upper limit value can be set according to the performance of each MFP 1 (such as the capacity of RAM 12c, etc.), and the above effects (i.e., the effect that the MFP 1 can transmit the scan data efficiently in a short time and avoid a situation where the scanning of the image of the plurality of document sheets P is to be performed from the beginning) can be more reliably obtained.

When the CPU 52a of the server 5 receives the "continuity pre-notice information" indicating the "continuity (to transmit more scan data after sending this scan data)" (S54: YES), the CPU 52a of the server 5 stores the scan data as a partial file in the RAM 52c (S55: storing process). Thereafter, when the CPU 52a receives further scan data and the "continuity pre-notice information" indicating the "termination (that no further scan data is transmitted after the transmission of this scan data)" (S54: NO), the CPU 52a combines the scan data with the above partial file (S57: combining process). In this case, data management can be properly performed by combining related scan data transmitted in small portions with each other.

Another Embodiment

Another embodiment according to aspects of the present disclosures will be described next.

In the present embodiment, the method of determining the "continuity result information" by the MFP 1 differs from the above-described embodiment. In the above-described embodiment, the "continuity result information" is determined based on the elapsed time, but in the present embodiment, the "continuity result information" is determined based on the operation of the user.

Specifically, when the CPU 12a of the MFP 1 detects a continuous operation by the user between the last transmitting process (S20) and the start of the current scanning process (S9), the CPU 12a of the MFP 1 transmits information indicating that the scan data is a continuation of the previously transmitted scan data (continuation) to the server 5 as the "continuity result information" On the other hand, no continuous operation by the user is detected between the last transmitting process (S20) and the start of the current reading process (S9), the CPU 12a transmits information indicating that the scan data is not a continuation of the previously transmitted scan data (i.e., the scan data is new) to the server 5 as the "continuity result information."

The continuous operation may be, for example, a long depressing (e.g., a sustained depressing for a particular period of time or longer) of the button 16b (see FIG. 3) that instructs the "start scanning" and the like.

According to the present embodiment, by determining the "continuity result information" based on the user's operation, a process reflecting the user's intention can be realized.

Although suitable embodiments according to aspects of the present disclosures have been described above, aspects of the present disclosures should not be limited to the above embodiments, and various design changes thereof are possible within the aspects of the present disclosures.

Modifications

In the above-described embodiment (FIG. 5), for example, in the upper limit value setting process, it is determined whether the upper limit information received from the server includes the plurality of upper limit values (S31), but a server storage (i.e., a storage of the server) may be configured to store only one upper limit value for one image processing apparatus and the above determination may not be performed. In such a case, the processes in S31 to S33 are omitted.

In the above-described embodiment, the upper limit value is set based on the data received from the server, but the configuration should not be limited to the above. For example, the upper limit value may be set based on the data entered by the user via the input device of the image processing apparatus.

The timing at which the upper limit is set does not need to be limited to a timing after shipment of the image processing apparatus, but may be at the time when the image processing apparatus is manufactured.

In the above-described embodiment, the server determines "whether or not the current scan data is a continuation of the previously transmitted scan data" based on the "continuity result information" which is different from the "job ID," but the configuration should not be limited to the above. For example, the server may determine "whether the current scan data is a continuation of the previously transmitted scan data" based on whether the "job ID" associated with the previous scan data is different from the "job ID" associated with the current scan data (i.e., whether the "job ID" has changed).

In the above-described embodiment, the image processing apparatus transmits the "continuity pre-notice information" and the "continuity result information" to the server in addition to the scan data, and the server stores the scan data as a partial file when receiving the "continuity pre-notice information" indicating the "continuity," and thereafter, when receiving the "continuity pre-notice information" indicating "termination," the server combines the scan data with the above-mentioned partial file. However, such a configuration could be modified. That is, storing as a partial file or combining the partial file with the scan data is not essential according to aspects of the present disclosures.

For each server, the upper limit information for the image processing apparatus stored in the server storage may be different for each server. In such a case, the upper limit value may be set for each provider of, for example, educational services and the like.

The image processing apparatus and the server may be communicatively connected to each other via one or more communication paths. When the image processor and the server are communicably connected to each other via a plurality of communication paths, there may be a communication path in which an upper limit is transmitted from the server to the image processor (e.g., a communication path of a constant connection) and a communication path in which scan data is transmitted from the image processor to the server (e.g., a communication path of a temporary connection) may differ from each other. Further, a communication protocol used to transmit the upper limit value from the server to the image processor (e.g., XMPP over BOSH) and the communication protocol used to transmit the scan data from the image processor to the server (e.g., HTTPS) may differ from each other.

In the above-described embodiment (FIG. 2), the document sheets P as a document medium are stacked in a flat state one by one in the sheet feed cassette 1$m$, but the configuration does not need to be limited to the above embodiment. The document medium may be housed in the sheet feed cassette 1$m$ in a rolled state and cut in the sheet conveying path R.

The document medium does not need to be limited to a paper, but may be, for example, a cloth, a resin member, or the like.

The head included in the image processing apparatus according to aspects of the present disclosures does not limited to be of a liquid discharge type (i.e., an inkjet type) but may be of a laser type, a thermal transfer type or the like.

The image processing apparatus according to aspects of the present disclosures does not need to include a head (i.e., an element for recording an image to a document medium) as long as it includes a scanning device. In other words, the image processing apparatus according to aspects of the present disclosures is not limited to an MFP, but may be a scanner.

A type of the scanning device is not limited to a flatbed type, but may be of an ADF (Auto Document Feeder) type.

The programs related to aspects of the present disclosures can be distributed as recorded on removable storage media such as flexible disks or fixed storage media such as hard disks. The programs pertaining to aspects of the present disclosures can also be distributed via a communication line.

What is claimed is:

1. An image processing apparatus, comprising:
a communication device configured to communicate with a server through a network;
a scanning device configured to generate scan data of an image of a document medium;
a storage; and
a controller,
wherein the controller is configured to perform:
an upper limit setting process of setting an upper limit value of scan data amount storable in the storage;
a scanning process of controlling the scanning device to generate the scan data of one document medium and store the scan data in the storage;
a determining process of determining, after performing the scanning process, whether an amount of the scan data accumulated in the storage exceeds the upper limit value;
when the controller determines that the amount of the scan data exceeds the upper limit value, an inhibiting process of inhibiting the scanning device from generating the scan data and a transmitting process transmitting the scan data accumulated in the storage to the server through the communication device and transmitting continuity result information indicating whether the scan data is a continuation of previously transmitted scan data to the server in addition to the scan data; and
a releasing process of deleting the scan data accumulated in the storage and releasing inhibition of the scanning process after performing the transmitting process,
wherein the controller is configured to:
when the scanning process is started before a particular time has elapsed after a previous transmitting process, transmit information indicating that the scan data is a continuation of the previously transmitted scan data to the server as the continuity result information; and
when the scanning process is started after the particular time has elapsed after a previous transmitting process, transmit information indicating that the scan data is not a continuation of the previously transmitted scan data to the server as the continuity result information.

2. The image processing apparatus according to claim 1, wherein the controller is configured to store the upper limit value received from the server via the communication device in the storage in the upper limit setting process.

3. The image processing apparatus according to claim 2, wherein the controller is further configured to perform:
receiving scanning setting information from the server through the communication device;
causing the scanning device to generate the scan data based on the scanning setting information received from the server in the scanning process; and
determining whether the amount of the generated scan data exceeds the upper limit value based on the scanning setting information in the determining process.

4. The image processing apparatus according to claim 1, wherein, in the upper limit setting process, the controller is further configured to perform:
a selection notifying process of notifying which of a plurality of the upper limit values is to be selected;
a receiving process of receiving information indicating which of the plurality of upper limit values is to be selected after the selection notifying process is performed; and
a setting process of setting the upper limit value based on the information received in the receiving process after the receiving process is performed.

5. The image processing apparatus according to claim 1, wherein the controller is configured to transmit, in the transmitting process, continuity pre-notice information indicating further scan data is to be transmitted in addition to the scan data after transmitting the scan data to the server.

6. An image processing apparatus, comprising:
a communication device configured to communicate with a server through a network;
a scanning device configured to generate scan data of an image of a document medium;
a storage; and
a controller,
wherein the controller is configured to perform:

an upper limit setting process of setting an upper limit value of scan data amount storable in the storage;

a scanning process of controlling the scanning device to generate the scan data of one document medium and store the scan data in the storage;

a determining process of determining, after performing the scanning process, whether an amount of the scan data accumulated in the storage exceeds the upper limit value;

when the controller determines that the amount of the scan data exceeds the upper limit value, an inhibiting process of inhibiting the scanning device from generating the scan data and a transmitting process transmitting the scan data accumulated in the storage to the server through the communication device and transmitting continuity result information indicating whether the scan data is a continuation of previously transmitted scan data to the server in addition to the scan data; and a releasing process of deleting the scan data accumulated in the storage and releasing inhibition of the scanning process after performing the transmitting process, wherein the controller is configured to:

when a continuous operation by a user is detected after the previous transmitting process is performed and before the scanning process is started, transmit information indicating that the scan data is a continuation of the previously transmitted scan data to the server as the continuity result information; and when the continuous operation by the user is not detected after the previous transmitting process is performed and before the scanning process is started, transmit information indicating that the scan data is not a continuation of the previously transmitted scan data to the server as the continuity result information.

7. The image processing apparatus according to claim 1, wherein the scanning device is of a flatbed type.

\* \* \* \* \*